(12) United States Patent
Zhang et al.

(10) Patent No.: US 10,508,781 B2
(45) Date of Patent: Dec. 17, 2019

(54) LIGHT BAR ASSEMBLING DEVICE AND LIGHT BAR ASSEMBLING METHOD USING THE SAME

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Qing Zhang, Beijing (CN); Qingjun Luan, Beijing (CN); Ting Wang, Beijing (CN); Yuhua Zhou, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 101 days.

(21) Appl. No.: 15/555,037

(22) PCT Filed: Mar. 17, 2017

(86) PCT No.: PCT/CN2017/077084
§ 371 (c)(1),
(2) Date: Aug. 31, 2017

(87) PCT Pub. No.: WO2018/010446
PCT Pub. Date: Jan. 18, 2018

(65) Prior Publication Data
US 2018/0259139 A1 Sep. 13, 2018

(30) Foreign Application Priority Data
Jul. 11, 2016 (CN) .......................... 2016 1 0539218

(51) Int. Cl.
*F21S 4/28* (2016.01)
*F21V 19/00* (2006.01)
(Continued)

(52) U.S. Cl.
CPC .............. *F21S 4/28* (2016.01); *F21V 19/003* (2013.01); *G02F 1/133603* (2013.01);
(Continued)

(58) Field of Classification Search
CPC .... F21S 4/28; F21V 19/003; G02F 1/133603; G02F 1/133615; G02F 1/1303;
(Continued)

(56) References Cited

U.S. PATENT DOCUMENTS 1,503,131 A * 7/1924 Nelson .................... B21D 24/02
24/DIG. 26
4,741,797 A * 5/1988 Henderson ............. B23Q 7/165
156/479

(Continued)

FOREIGN PATENT DOCUMENTS

CN 102310389 A 1/2012
CN 103823311 A 5/2014
(Continued)

OTHER PUBLICATIONS

KR-100580943; Kwon et al.; Cleaning System . . . ; EPO English Machine Translation; Mar. 16, 2019; pp. 1-4.*
(Continued)

*Primary Examiner* — Bayan Salone
(74) *Attorney, Agent, or Firm* — Womble Bond Dickinson (US) LLP (57) ABSTRACT

The present discourse relates to a technical field of a manufacture of a display device, and in particular relates to a light bar assembling device and a light bar assembling method using the light bar assembling device. The light bar assembling device includes a rotating platform and a press drive module disposed at an outside of the rotating platform. The rotating platform is provided with bonding process positioning carriers for back plates to be bonded with the
(Continued)

light bar and pressing process positioning carriers for the back plates bonded with the light bars. The press drive module is configured to perform a pressing operation on the light bar bonded at the back plate. The device can integrate the bonding process and the pressing process, improving work efficiency.

16 Claims, 6 Drawing Sheets

(51) Int. Cl.
| | |
|---|---|
| G09G 3/32 | (2016.01) |
| G02F 1/13 | (2006.01) |
| G01S 11/02 | (2010.01) |
| G02F 1/1335 | (2006.01) |
| F21Y 115/10 | (2016.01) |
| F21Y 103/10 | (2016.01) |
| G02F 1/13357 | (2006.01) |
| G01B 11/02 | (2006.01) |

(52) U.S. Cl.
CPC ......... *G02F 1/133615* (2013.01); *G09G 3/32* (2013.01); *F21Y 2103/10* (2016.08); *F21Y 2115/10* (2016.08); *G01B 11/02* (2013.01); *G02F 1/1303* (2013.01); *G02F 1/1336* (2013.01); *G02F 2201/503* (2013.01); *G02F 2202/28* (2013.01); *G09G 2310/0264* (2013.01); *Y10T 29/49904* (2015.01)

(58) Field of Classification Search
CPC ............... G02F 1/1336; G02F 2202/28; G02F 2201/503; G09G 2310/0264; G09G 3/32; F21Y 2115/10; F21Y 2103/10; Y10T 29/49904; G01B 11/02
See application file for complete search history.

(56) References Cited

U.S. PATENT DOCUMENTS

| | | | |
|---|---|---|---|
| 5,341,563 A | 8/1994 | Kamakura et al. | |
| 2013/0039536 A1* | 2/2013 | Silver | G06T 7/70 |
| | | | 382/103 |
| 2013/0139949 A1* | 6/2013 | Obuse | B30B 15/34 |
| | | | 156/64 |
| 2014/0320867 A1* | 10/2014 | Kanno | B24B 37/013 |
| | | | 356/630 |
| 2017/0089550 A1 | 3/2017 | Deng et al. | |

FOREIGN PATENT DOCUMENTS

| | | | | |
|---|---|---|---|---|
| CN | 105644115 | * | 2/2015 | ............ B32B 37/10 |
| CN | 204176571 U | | 2/2015 | |
| CN | 105116614 A | | 12/2015 | |
| CN | 205008840 U | | 2/2016 | |
| CN | 105538877 A | | 5/2016 | |
| CN | 105644115 A | | 6/2016 | |
| CN | 106002826 A | | 10/2016 | |
| CN | 205799387 U | | 12/2016 | |
| KR | 1020060013614 A | | 2/2006 | |
| KR | 100580943 B1 | * | 5/2006 | ............... G02F 1/13 |
| KR | 1020100113711 A | | 1/2010 | |
| KR | 1020100113711 A | | 10/2010 | |
| TW | 201314106 A | | 4/2013 | |

OTHER PUBLICATIONS

CN-105644115; Deng et al.; Laminating Machine; EPO English Machine Translation; Mar. 16, 2019; pp. 1-11.*
Eaton; Transfer Switches Document (CA08104001E); Oct. 2015; pp. 1-106.*
International Search Report and Written Opinion in PCT/CN2017/077084 dated Jun. 22, 2017, with English translation.
Office Action in Chinese Application No. 201610539218.3 dated Jun. 2, 2017, with English translation.
Office Action received for Chinese Patent Application No. 201610539218.3, dated Oct. 19, 2017, 17 pages (11 pages of English Translation and 6 pages of Office Action).

* cited by examiner

LIGHT BAR ASSEMBLING DEVICE AND LIGHT BAR ASSEMBLING METHOD USING THE SAME

RELATED APPLICATION

The present application claims the priority of Chinese patent application No. 201610539218.3, the entire content thereof is incorporated herein by reference.

FIELD OF THE DISCLOSURE

The present discourse relates to a technical field of manufacture of a display device, and in particular relates to a light bar assembling device and a light bar assembling method using the light bar assembling device.

BACKGROUND OF THE DISCLOSURE

In a industrial chain of a TEL-LCD, a backlight product technology is an important part in this field, while an LED light bar is one of core components of a back light module. With the development of technology and the wide usage of the Liquid crystal display, higher requests have been put forward to the performance of Liquid crystal display in the market. For example, the liquid crystal display used in automobiles should be robust and shock resistant; some dashboard displays are required to be heat resistant; the strength of the liquid crystal displays need to increase while the thickness of the liquid crystal displays need to decrease. In traditional back light module, the LED light bar is fixed by screws. However, this fixing method is obsolete. Double side adhesive tape is currently used for bonding. However, during the operation of bonding using adhesive tape, the problems that the bonding is not tight enough, the strength of the bonding is not uniform enough and the bonding position is offset can easily occur. Therefore, during the assembling operation of the LED light bar, the components to be assembled must be effectively secured and positioned. After bonding, the light bar needs to be pressed and attached perpendicular to the surface of the light bar so that the light bar can be secured onto the back plate of the back light module accurately and tightly.

Therefore, a need exists for an improved light bar assembling device to realize a better light bar assembly.

SUMMARY OF THE DISCLOSURE

In view of the problems described above, the present disclosure provides an improved light bar assembling device and a light bar assembling method using the light bar assembling device.

According to a first aspect, the present disclosure provides a light bar assembling device, comprising a rotating platform and a press drive module disposed at an outside of the rotating platform. The rotating platform is provided with bonding process positioning carriers for back plates to be bonded with the light bars and pressing process positioning carriers for the back plates bonded with the light bars. The press drive module is configured to perform pressing operation on the light bar bonded at the back plate. The light bar assembling device can integrate the bonding process and the pressing process of the light bar. Therefore, the transferring and waiting time can be reduced and the working efficiency can be improved.

In an optional embodiment, the device is provided with two bond positioning carriers and two press positioning carriers. In such an arrangement, the bonding process and the pressing process can be performed concurrently.

In a further optional embodiment, the rotating platform is provided with a disc-shaped rotating base, and the bond positioning carriers and the press positioning carriers are arranged at the surface of the base along a circumferential direction. Such an arrangement can facilitate the bonding and pressing process to be performed cyclically.

In an optional embodiment, the bond positioning carrier has a groove that matches a side edge of the light bar to be mounted.

In an optional embodiment, the press positioning carrier has a boss that matches the body shape of the back plate bonded with the light bar, so that the back plate can inverted and engaged onto the boss. When the back plate is inverted and engaged onto the carrier, it can be carried more firmly. At this time, the press fit action can directly act on the side of the back plate bonded with the light bar, avoiding damage to the light bar caused by impacting the surface of the light bar directly.

In a further optional embodiment, the side of the boss facing towards the periphery of the rotating platform has notches for avoiding the light source of the light bar. The notches can protect the light source on the light bar to avoid damage.

In an optional embodiment, the underside of the rotating platform is provided with a locking device to lock the rotating platform. Such locking can ensure the stability of the rotating platform during press fit action, thereby improving the press precision.

In an optional embodiment, the locking device is a pneumatic plunger, and the rotating platform has a hole for inserting the pneumatic plunger.

In an optional embodiment, there is a position detecting device disposed under the rotating base for detecting the back plate. The position detecting device can be used to precisely control the rotation of the rotating platform, thereby improving the alignment precision.

In an optional embodiment, the position detecting device for the back plate can be implemented as a photoelectric sensor or metal sensor.

In an optional embodiment, the press drive module comprises a biaxial cylinder and a pressing head.

In an optional embodiment, the light bar assembling device further comprises a flow restricting air pressure gauge for the press drive module. Therefore, the pressing strength can be adjusted precisely according to different requirements.

In an optional embodiment, the light bar assembling device further comprises a switch of the rotating platform for switching between a manual rotation mode and an automatic rotation mode. According to different machine model requirements, the switching between automatic rotation and manual rotation can be realized by controlling the switch.

In an optional embodiment, the bonding process positioning carriers and the pressing process positioning carriers are replaceable. The carriers can be exchanged to adapt to back plates and light bars with different sizes.

According to another aspect, the present disclosure provides a method for assembling light bar by means of the above described light bar assembling device, comprising the following steps:

securing a back plate onto a bonding process positioning carrier and bonding a light bar onto a side edge of the back plate;

inverting the back plate bonded with the light bar and engaging it onto the pressing process positioning carrier, with the side of the back place bonded with the light bar facing the outside of the rotating platform;

rotating the rotating platform until the pressing process positioning carrier carrying the back plate is aligned with the press drive module; and driving the press drive module to perform pressing operation on the light bar on the back plate.

The light bar assembling device according to the embodiment of the present disclosure has simple structure, and is convenient to maintain and also realizes the integration of LED light bar bonding and pressing processes which can reduce the manpower demand by 50%. Besides, by using the rotation device, it can also reduce waiting time in addition to the concurrent operations of the bonding and pressing.

The accompanying drawings, which are included to provide a further understanding of the embodiments and are incorporated in and constitute a part of this specification, illustrate embodiments of the disclosure, and together with the description serve to explain the principles of the disclosure. One of those ordinarily skilled in the art will readily recognize many other embodiments and advantages of the embodiments, and those embodiment and advantages will be better understood by referring to the following description. The figures are not necessarily drawn to scale and elements of similar structures or functions are generally represented by like reference numerals for illustrative purposes throughout the figures.

DETAILED DESCRIPTION OF THE DISCLOSURE

In the following description, the present disclosure will be described in detail with reference to drawings which form part of the detailed description and illustrate specific embodiments wherein the present disclosure can be practiced. Therefore, directional terms can be used with reference to the orientation of the drawings, such as "top", "bottom", "left", "right", "upper", "lower" and the like. The components of the embodiments can be positioned in several different orientations, these directional terms are only used for illustrative and not limitative purpose. It should be appreciated that other embodiments can be used or logical changes can be made without departing from the scope of the present disclosure. Therefore, the following detailed embodiment should not be used to limit and the scope of the present disclosure should be only defined by the claims.

It should be appreciated that the features of various exemplary embodiments can be combined with each other, unless otherwise indicated.

Figure 1:
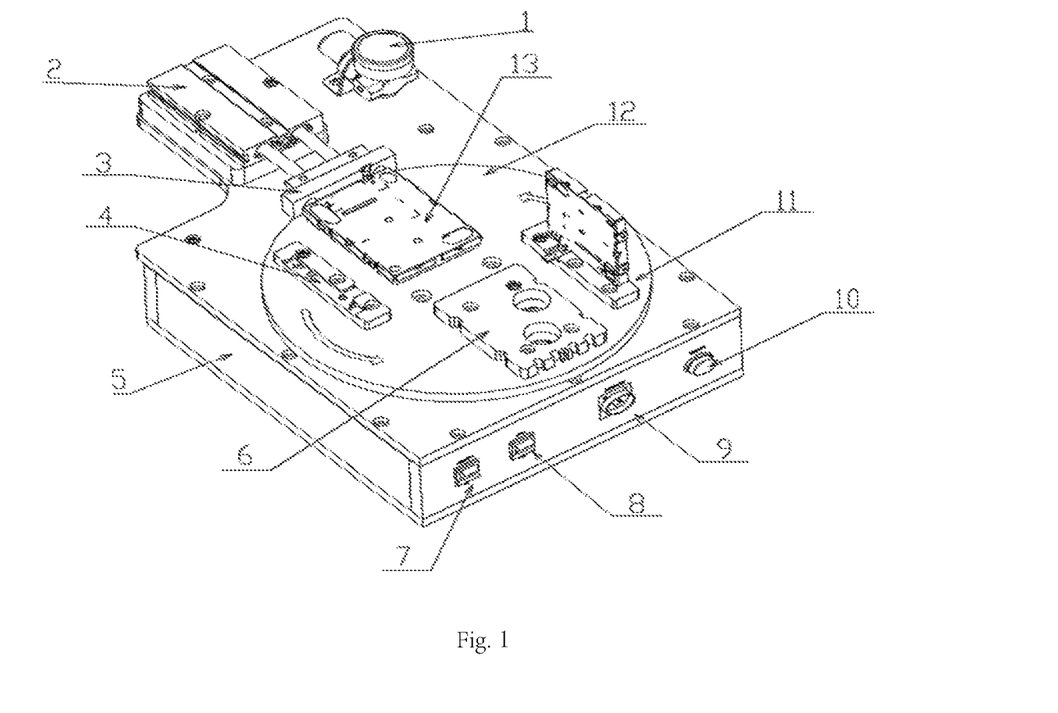
FIG. 1 is a schematic view showing a general structure of a light bar assembling device according to an embodiment of the present disclosure.

FIG. 1 is a schematic view showing a general structure of a light bar assembling device according to an embodiment of the present disclosure. As can be seen from FIG. 1, the light bar assembling device mainly comprises a rotating platform 12 and a press drive module 2 which are disposed in the base 5 respectively. Bonding process positioning carriers 4, 11 and pressing process positioning carriers 6, 13 are disposed on the rotating platform 12. The bonding process positioning carriers 4, 11 are used for carrying back plates (also called bottom plates) of display devices needing to bond light bars. The bonding process positioning carrier 4 is a carrier without carrying a back plate, while the bonding process positioning carrier 11 is a carrier that carries a back plate. When the back plate is placed onto the bonding process positioning carrier, an operator can conveniently bond the light bar provided with a backlight source onto an inside of the back plate. The pressing process positioning carriers 6, 13 are used to carry the back plates bonded with the light bars and needing to be pressed. The pressing process positioning carrier 6 is a carrier without carrying a back plate, while the pressing process positioning carrier 13 is a carrier carrying a back plate. The number of each of the two kinds of carriers shown in FIG. 1 is two, and they are alternately arranged on the rotating platform 12 circumferentially. Such arrangement can facilitate a pipeline operation with two processes integrated. For example, when an operator performs a bonding operation, the device can also perform a pressing operation simultaneously. Of course, optionally, more carriers can be disposed on the rotating platform 12 and preferably, the above described carriers are replaceable and respective carriers can be replaced to adapt different specifications of back plates, thereby the adaptability of the assembling device can be improved to a large extent.

The press drive module 2 can be arranged at the outside of the rotating platform 12. As the rotating platform 12 rotates, the pressing process positioning carrier 13 carrying the back plate to be pressed can be aligned with the press drive module 2 (as shown in FIG. 1). The press drive module 2 can drive a pressing head to stretch out to press the back plate. As further can be seen in FIG. 5A and FIG. 5B, the press drive module 2 can be implemented in a biaxial cylinder form. A flow restricting air pressure gauge 1 can be disposed on the base 5 which can be used to set the magnitude of the air pressure in the cylinder in the press drive module 2, so that the pressing pressure can be adjusted.

Furthermore, the light bar assembling device is further provided with a time-delay relay 9, which is adjustable and can be used to adjust the pressing duration of the back plate so as to meet different requirements. An adjusting knob of the time delay relay 9 can be disposed e.g. on the operating panel at the front face of the base 5, as further shown in FIG. 7.

The light bar assembling device according to the embodiment of the present disclosure achieves the integration of the light bar bonding and pressing processes, which can reduce the time waste for transferring and waiting. The light bar assembling device has simple structure, good flexibility and is easy to maintain.

Figure 2:
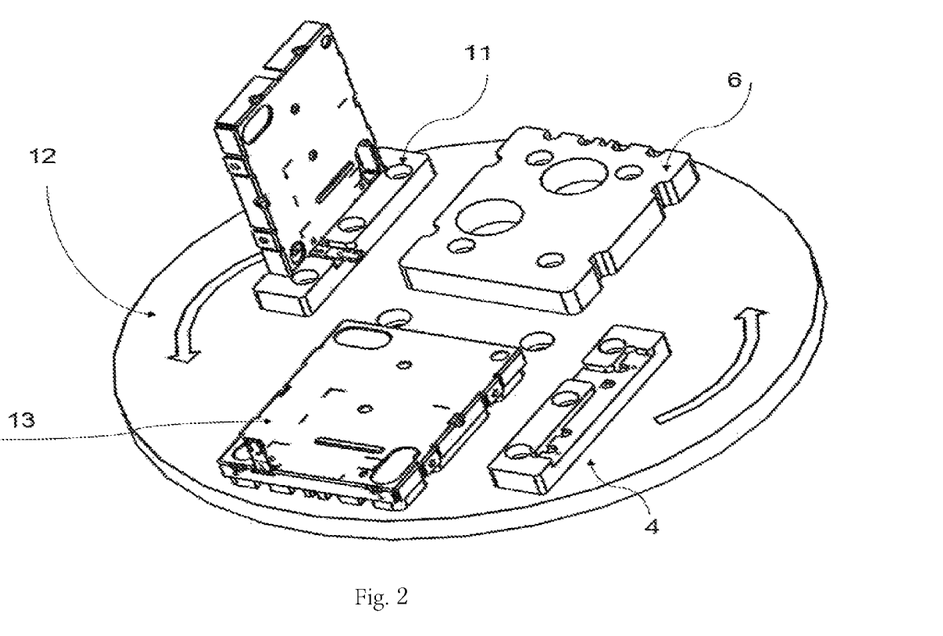
FIG. 2 is a schematic structural view showing a rotating platform in the light bar assembling device according to an embodiment of the present disclosure.

FIG. 2 is a schematic view showing the structure of a rotating platform in the light bar assembling device according to the embodiment of the present disclosure. The rotating platform has a rotating base which is in disc-shape. The bonding process positioning carriers and the pressing process positioning carriers are all disposed on the rotating base and are arranged in the circumferential direction. Its rotation direction is preferably marked on the rotating base which is convenient for the operator to operate. Of course, the rotating base can also have other shapes beside the disc shape, such as rectangular.

Figure 3A:
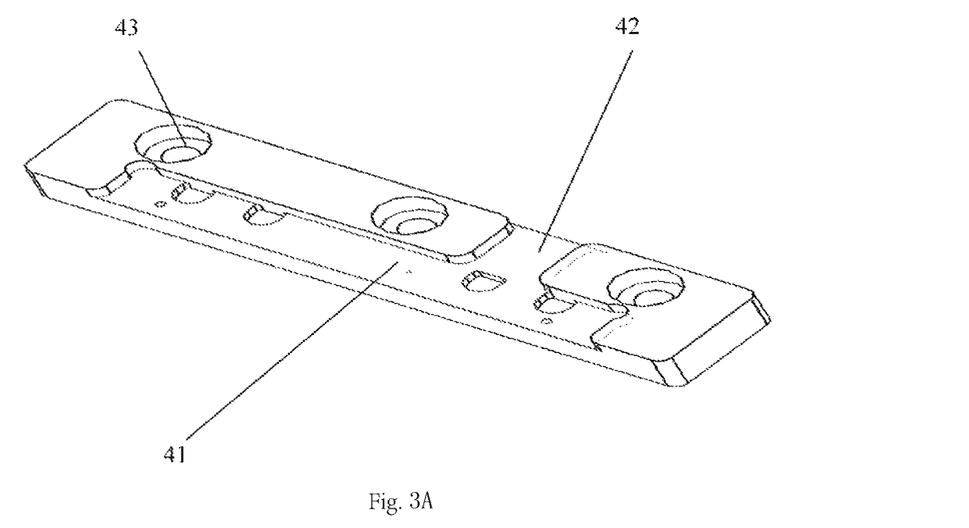
FIG. 3A is a schematic structural view showing a bonding process positioning carrier in the light bar assembling device according to an embodiment of the present disclosure.

FIG. 3A is a schematic view showing the structure of a bonding process positioning carrier in the light bar assembling device according to the embodiment of the present disclosure. The carrier 4 is used to carry the back plate needing to bond the light bar, therefore the carrier 4 has a groove 41 for engaging the back plate. The groove 41 can match a side edge of the back plate needing to install the light bar. That is, the side edge can be stably engaged in the groove 41. The carrier 4 is also provided with a groove 42 to let a flexible circuit board in the light bar to be installed pass through. Moreover, the carrier 4 has screw holes 43 so that the carrier 4 can be fixed on the rotating base by screws. Of course, the carrier 4 can also be fixed on the rotating base by any other fixing method.

It should be recognized that the carrier 4 shown in FIG. 3A is only an example. As to the back plates with different shapes and specifications, the carriers 4 can have other shapes and sizes.

Figure 3B:
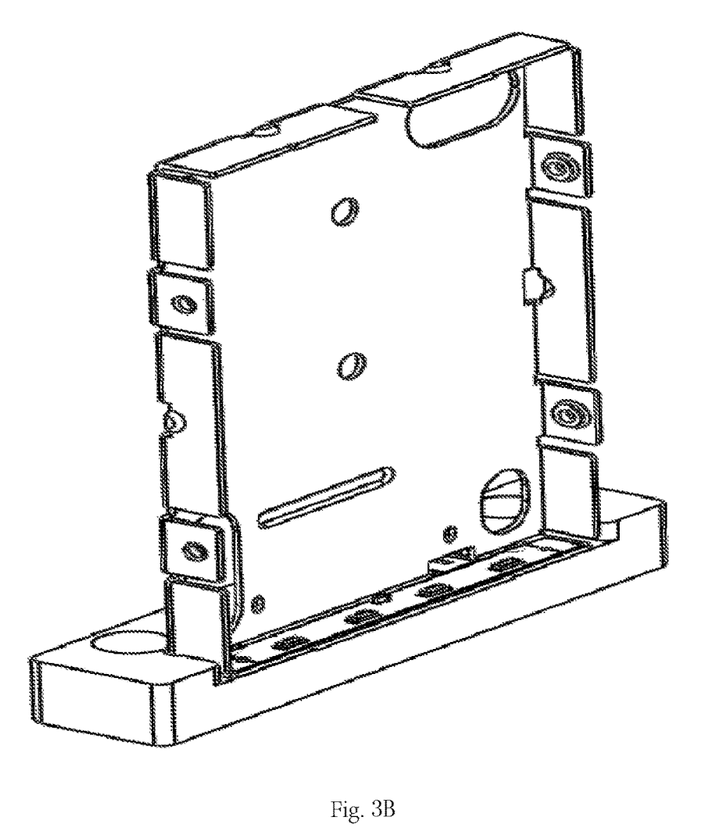
FIG. 3B is a schematic status view showing the bonding process positioning carrier when carrying the back plate according an embodiment of the present disclosure.

FIG. 3B is a schematic status view showing the bonding process positioning carrier when carrying the back plate according the embodiment of the present disclosure. As can be seen from FIG. 3B, the back plate can be stably engaged in the groove 41 so as to conveniently perform bonding operation, that is, the light bar with light source can be bonded at the side edge by means of a double sided adhesive tape.

Figure 4A:
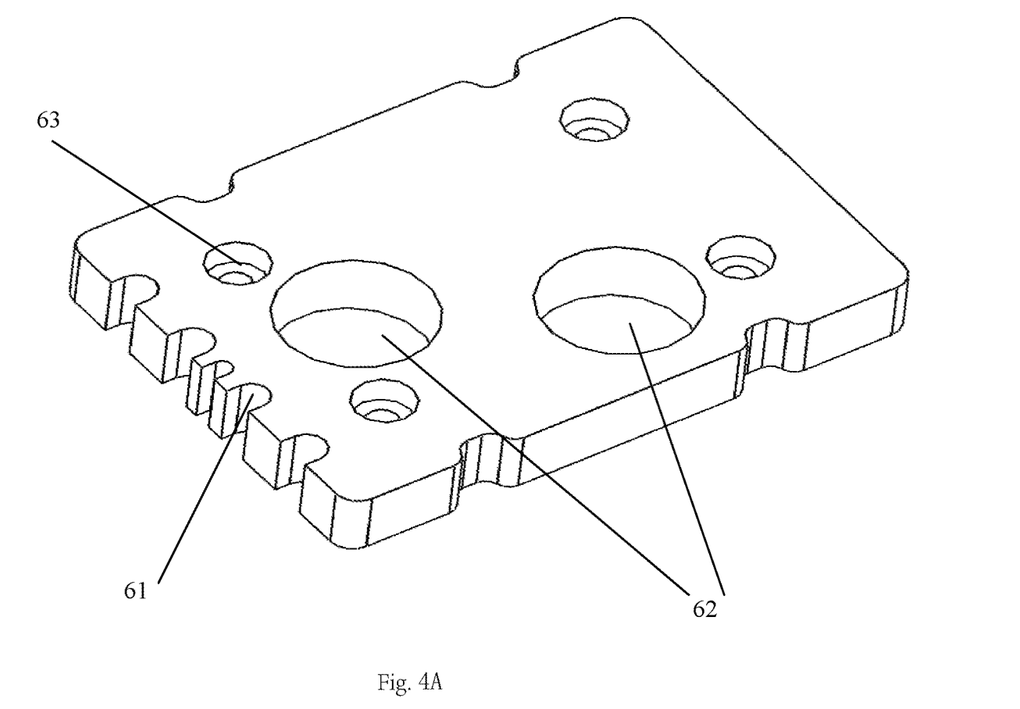
FIG. 4A is a schematic structural view showing the pressing process positioning carrier in the light bar assembling device according to an embodiment of the present disclosure.

FIG. 4A is a schematic view showing the structure of the pressing process positioning carrier in the light bar assembling device according to the embodiment of the present disclosure. The carrier 6 has a boss with a shape matching a shape of a main body of the back plate bonded with light bar so that the back plate can be conveniently inverted and engaged onto the boss. In particular, a side edge of the carrier 6 (that is, the side edge facing the outside of the rotating platform) has notches 61 for avoiding the backlight (such as LED) on the back plate so as to prevent damage to the backlight during pressing. The carrier 6 is further provided with holes 62 to let light signals from the position detecting device for the back plate (which will be further described below) to pass through, which will be described in detail below. The carrier 6 is further provided with screw holes 63 and the carrier 4 can be fixed on the rotating base by screws. Of course, the carrier 4 can also be fixed on the rotating base by any other fixing method.

It should be recognized that the carrier 6 shown in FIG. 4A is only an example. As to back plates with different shapes and specifications, the carriers 6 can have other shapes and sizes.

Figure 4B:
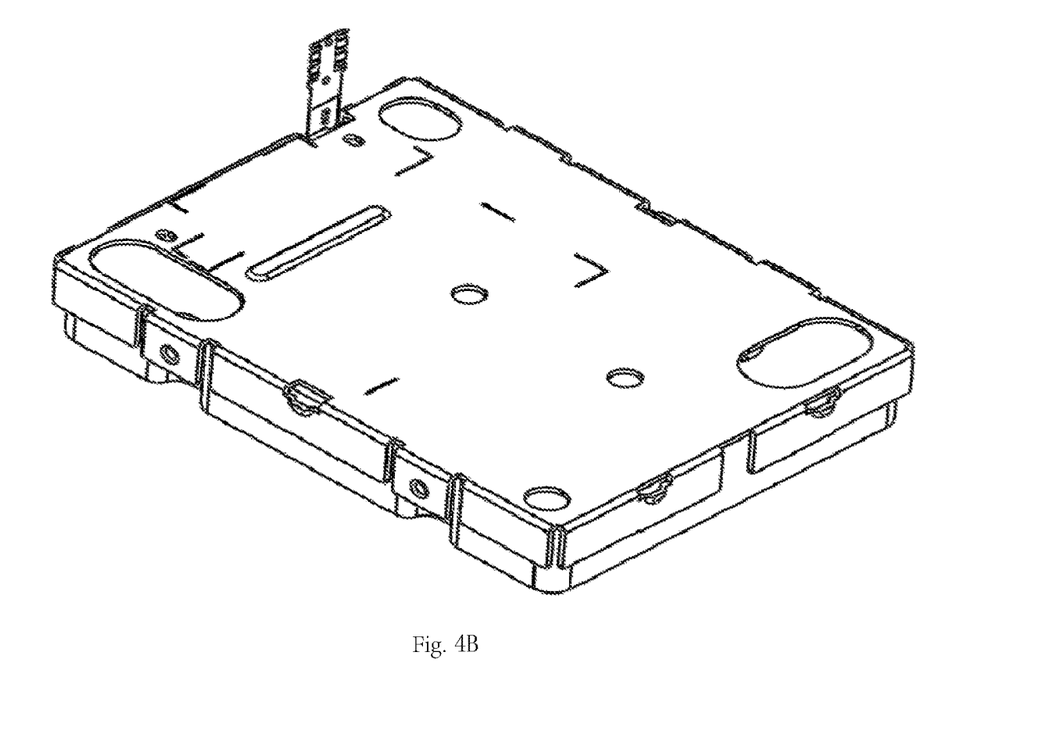
FIG. 4B is a schematic status view showing the pressing process positioning carrier when carrying the back plate according to an embodiment of the present disclosure.

FIG. 4B is a schematic status view showing the pressing process positioning carrier when carrying the back plate according to the embodiment of the present disclosure. As can be seen from FIG. 4B, the back plate bonded with the light bar can be inverted and engaged onto the boss firmly and its side edges can be engaged with four side edges of the boss. Besides, the side edge bonded with light bar can be aligned with the side edge of the boss having the notches 61 so that the light source on the light bar can be exactly housed in the notches 61. Inverting and engaging the back plate onto the boss can make this carrying more stable so as to improve the stability of the pressing operation.

As can be seen from FIG. 4B, the flexible circuit board (FPC) provided on the light bar that is bonded on the back plate protrudes out from the back plate.

Figure 5A:
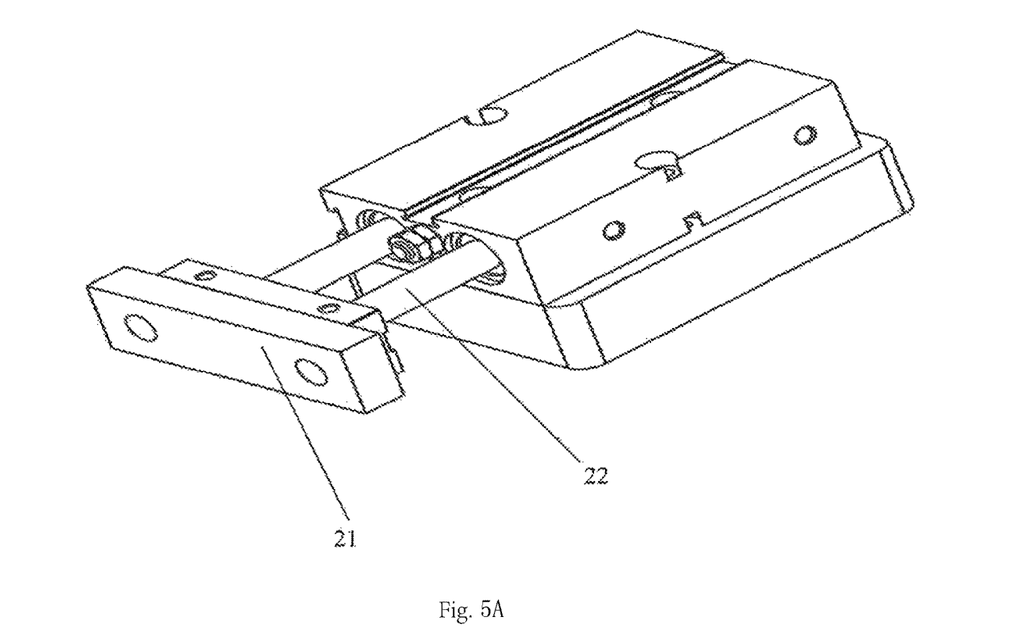
FIG. 5A shows a detailed structure of the press drive module in the light bar assembling device according an embodiment of the present disclosure.

FIG. 5A shows the detailed structure of the press drive module in the light bar assembling device according the embodiment of the present disclosure. The press drive module 2 has a pressing head 21 and an air cylinder 22. The pressing head 2 is connected to a drive lever at the air cylinder 22 and has a flat front face to exert pressure onto the side edge of the back plate. The air cylinder 22 preferably has two cylinders. The press drive module does not need a guide rail, which can reduce the production cost.

Figure 5B:
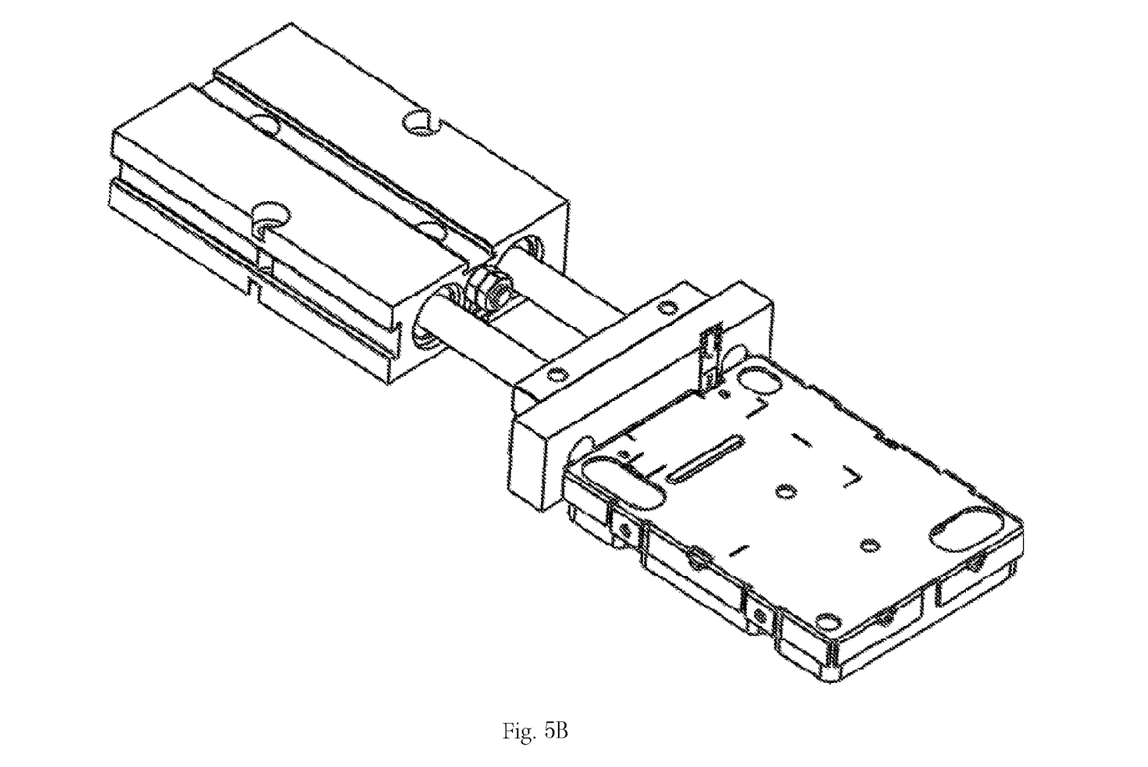
FIG. 5B is a schematic view showing a state of the press drive module when pressing the light bar in the back plate according an embodiment of the present disclosure.

FIG. 5B is a schematic view showing the press drive module when pressing the light bar in the back plate according to the embodiment of the present disclosure. As can be seen from FIG. 5B, when pressing, a drive lever of the air cylinder can protrude out so that the pressing head can be pressed onto a side of the back plate thereby to exert pressure at the side edge of the back plate bonded with a light bar. As described above, by adjusting the time-delay relay 9, the duration of the pressing time can be adjusted; and by adjusting the flow restricting air pressure gauge 1, the magnitude of the pressure can be adjusted.

Figure 6:
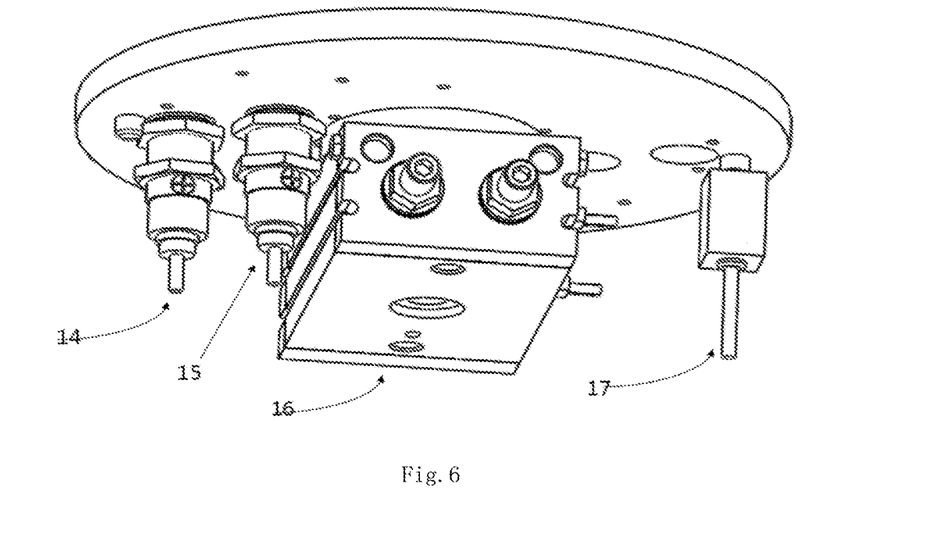
FIG. 6 is a schematic view showing an arrangement of a position detecting device and a locking device disposed under the rotating platform according to an embodiment of the present disclosure.

As can be clearly seen from FIG. 5B, during pressing operation, it must be ensured that the pressing process positioning carrier 6 carrying the back plate is aligned with the press drive module. FIG. 6 is a schematic view showing the arrangement of components disposed under the rotating platform according to the embodiment of the present disclosure. As can be seen in FIG. 6, a position detecting device for the back plate and a locking device are disposed under the rotating base.

The position detecting device for the back plate can be implemented as a photoelectric sensor. Holes can be provided in the press positioning carrier and the rotating base at corresponding positions to let the light emitting from the photoelectric sensor pass through. When the photoelectric sensor detects light reflected back from the back plate, it can emit signals to indicate the pressing process positioning carrier carrying the lack plate has reached the designated position so that the pressing operation can be performed. Preferably, there can be two position detecting devices for the back plate (for example, sensor 14 and sensor 15 in FIG. 6) to improve the detection precision.

In another embodiment, the position detecting device for the back plate can be implemented as a metal sensor. When the metal sensor detects the back plate made of metal appearing at its vicinity, the rotating platform will be controlled to stop in order to perform a pressing operation.

Besides, a rotation drive device 16 and a locking device 17 are provided under the base. For example, the rotation drive device 16 can be a rotation cylinder. The cylinder can be used to drive the rotating base to rotate. When the back plate detecting device has detected the back plate, the rotation drive device 16 will stop driving the rotating base to rotate and the locking device 17 will lock the rotating base, then the above pressing process will be performed. The rotation drive device 16 can be implemented as a step motor.

For example, the locking device 17 can be a pneumatic plunger. When the rotating base stops rotating and the pressing operation is about to start, the pneumatic plunger will pop up and insert into the hole of the base to lock the rotating base so that the motion of the rotating base can be prevented and the precision of the pressing operation can be ensured.

Figure 7:
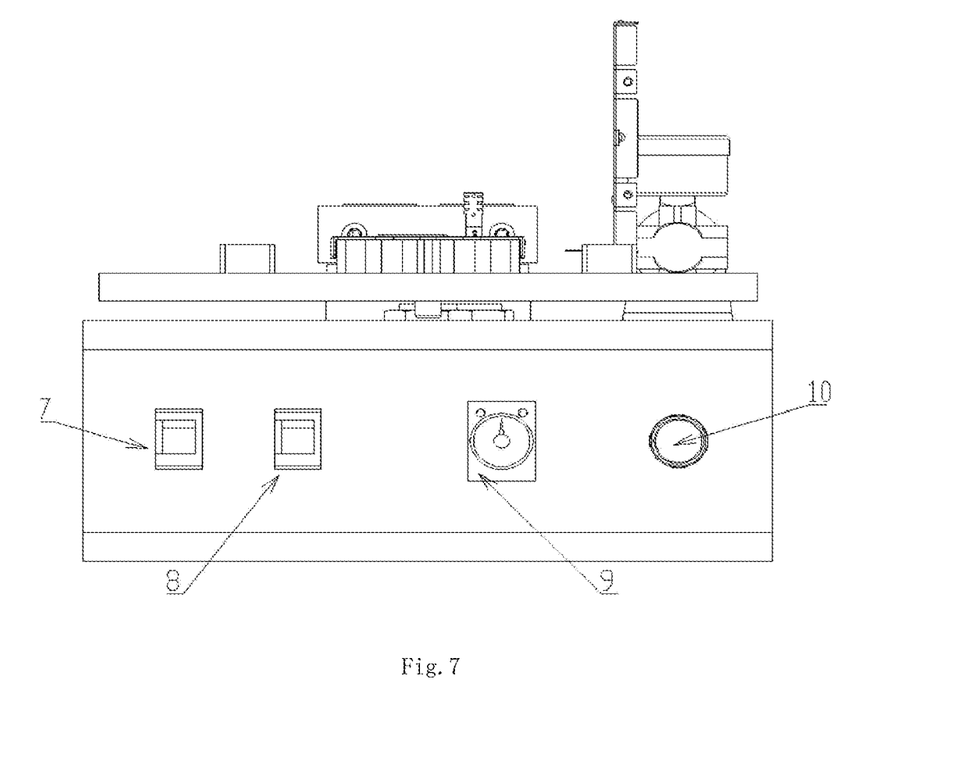
FIG. 7 is a schematic view showing a control panel of the light bar assembling device according to an embodiment of the present disclosure.

FIG. 7 is a schematic view showing a control panel of the light bar assembling device according to the embodiment of the present disclosure. As can be seen from FIG. 7 and FIG. 1, an operating panel is provided on the front face of the light bar assembling device. The operating panel is provided with a power switch 7, a manual/automatic rotation mode switching switch 8, a time-delay relay adjusting knob 9 and a manual operating switch 10. The manual/automatic mode switching switch 8 can be used to switch the operating modes of the light bar assembling device. In the automatic mode, the rotation of the rotating base can be controlled by the assembling device automatically; while in the manual mode, the rotation of the rotating base can be controlled by operating the manual operating switch 10 manually by the user.

Figure 8:
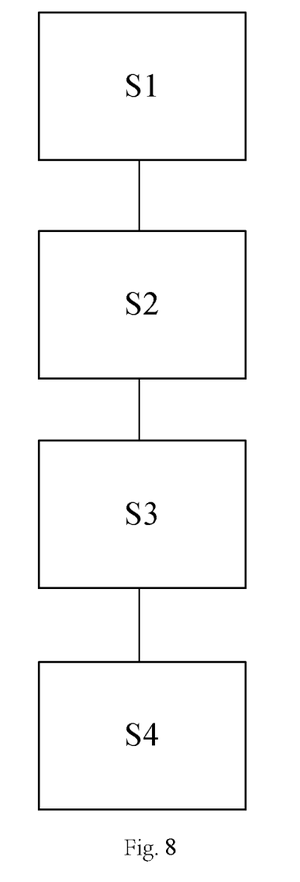
FIG. 8 shows a method for assembling a light bar using the light bar assembling device according to an embodiment of the present disclosure.

The light bar assembling method by means of the light bar assembling device provided by the embodiment of the present disclosure will hereafter be described in conjunction with FIG. 8.

In step S1, the back plate is fixed at the bonding process positioning carrier and then the light bar is bonded at the side edge of the back plate. By using the bonding process positioning carrier, this step is easy to operate and less prone to error. This step can be performed when the rotating platform stops rotating.

In step 2, the back plate bonded with the light bar is inverted and engaged onto the pressing process positioning carrier. Meanwhile, the side of the back plate bonded with the light bar is facing towards the outside of the rotating platform. By using the pressing process positioning carrier, this step is easy to operate.

In step S3, the rotating platform is rotated until the pressing process positioning carrier carrying the back plate is aligned with the press drive module. The rotation can be controlled automatically or manually and the alignment of the pressing process positioning carrier and the press drive module can be detected by the above described position detecting device.

In step S4, the press drive module is driven to perform a pressing operation on the light bar on the back plate. Preferably, during the pressing operation, the locking device 17 can lock and immobilize the rotating base in order to improve the pressing precision, avoiding damages to the back plate caused by the shake of the rotating base.

It should be noted that although various steps of the method are described above, it does not mean the steps must be performed exactly in the described order. Actually, these steps can be performed simultaneously or in other order, e.g., in the case that the light assembling device has more than two sets of positioning carriers. In pipeline operation, the above steps can be performed cyclically.

The detailed embodiment of the present application has been described, but the present disclosure is not limited thereto but only restricted by claims. Those skilled in the art will readily appreciate alternations or variations can be made within the technical scope of the present application. All those alternations or variations are included in the protection scope of the present application. Therefore, the protection scope of the present disclosure shall be subject to the protection scope defined by the claims.

In the description of the present application, it should be understood that terms such as "upper", "lower", "inner", "outer" and the like indicating orientation or positional relationships are based on the orientation or positional relationship shown in the drawings, which are merely for convenience of description but not to imply or suggest the indicated devices or elements must have particular orientations or positions, constructed or operated in particular orientations, and not to limit the present application. The term "comprise" or "comprising" does not exclude the presence of other elements or steps. Words "one" or "a" preceding element does not exclude the plural references of such elements and vice-versa. The mere fact that certain measures are recited in mutually different dependent claims does not indicate that a combination of these measures cannot be used to advantage. Any reference signs in the claims should not be construed as limiting the scope of the claims or the disclosure.

The invention claimed is:

1. A light bar assembling device, comprising:
a rotating platform provided with bonding process positioning carriers for a back plate to be bonded with the light bar and pressing process positioning carriers for the back plate bonded with the light bar, wherein each of the bonding process positioning carriers has a groove that matches a side edge of the light bar to be mounted, and each of the pressing process positioning carriers has a boss that matches a body shape of the back plate bonded with the light bar; and
a press drive module disposed at an outside of the rotating platform and comprising a pressing head,
wherein the press drive module is configured to drive the pressing head to stretch out in a plane parallel to a rotation plane of the rotating platform to perform a pressing operation on the light bar bonded at the back plate, when the pressing process positioning carrier carrying the back plate bonded with the light bar rotates along with the rotating platform to be aligned with the press drive module.

2. The light bar assembling device according to claim 1, wherein the device is provided with two bonding process positioning carriers and two pressing process positioning carriers.

3. The light bar assembling device according to claim 2, wherein the rotating platform is provided with a disc-shaped rotating base, and the bonding process positioning carriers and the pressing process positioning carriers are arranged at a surface of the base along a circumferential direction.

4. The light bar assembling device according to claim 1, wherein a side of the boss facing towards a periphery of the rotating platform has notches for avoiding a light source of the light bar.

5. The light bar assembling device according to claim 1, wherein an underside of the rotating platform is provided with a locking device for locking the rotating platform.

6. The light bar assembling device according to claim 5, wherein the locking device is a pneumatic plunger, and the rotating platform has a hole for inserting the pneumatic plunger.

7. The light bar assembling device according to claim 1, wherein there is a position detecting device for the back plate disposed under the rotating base.

8. The light bar assembling device according to claim 7, wherein the position detecting device for the back plate can be implemented as a photoelectric sensor or metal sensor.

9. The light bar assembling device according to claim 1, wherein the press drive module comprises a biaxial cylinder and the pressing head.

10. The light bar assembling device according to claim 1, further comprising a flow restricting air pressure gauge for the press drive module.

11. The light bar assembling device according to claim 1, further comprising a switch of the rotating platform for switching between a manual mode and an automatic rotation mode.

12. The light bar assembling device according to claim 1, wherein the bonding process positioning carriers and the pressing process positioning carriers are replaceable.

13. A method for assembling a light bar by the light bar assembling device according to claim 1, comprising the following steps:
    securing a back plate onto a bonding process positioning carrier and bonding a light bar onto a side edge of the back plate;
    inverting the back plate bonded with the light bar and engaging it onto the pressing process positioning carrier, with the side of the back place bonded with the light bar facing an outside of the rotating platform;
    rotating the rotating platform until the pressing process positioning carrier carrying the back plate is aligned with the press drive module; and
    driving the press drive module to perform a pressing operation on the light bar on the back plate.

14. The light bar assembling device according to claim 2, wherein an underside of the rotating platform is provided with a locking device for locking the rotating platform.

15. The light bar assembling device according to claim 3, wherein an underside of the rotating platform is provided with a locking device for locking the rotating platform.

16. The light bar assembling device according to claim 4, wherein an underside of the rotating platform is provided with a locking device for locking the rotating platform.

* * * * *